United States Patent [19]

Vroom

[11] 4,058,500
[45] Nov. 15, 1977

[54] SULPHUR CEMENTS, PROCESS FOR MAKING SAME AND SULPHUR CONCRETES MADE THEREFROM

[76] Inventor: Alan H. Vroom, 10728 Willowfern Drive S.E., Calgary, Alberta, Canada

[21] Appl. No.: 659,659

[22] Filed: Feb. 20, 1976

Related U.S. Application Data

[63] Continuation of Ser. No. 581,735, May 29, 1975, abandoned.

[51] Int. Cl.² .......................... C08F 28/02; C08K 3/06
[52] U.S. Cl. .............................. 260/42.24; 260/37 R; 260/79; 260/79.5 NV
[58] Field of Search .......... 260/42.24, 37 R, 79.5 NV, 260/79

[56] References Cited

U.S. PATENT DOCUMENTS

| | | |
|---|---|---|
| 2,309,692 | 2/1943 | Chittick et al. .......... 260/79.5 NV X |
| 3,290,266 | 12/1966 | Barnes et al. ................. 260/42.24 X |
| 3,371,072 | 2/1968 | Signouret et al. ...................... 260/79 |
| 3,459,717 | 8/1969 | Signouret et al. ...................... 260/79 |
| 3,465,064 | 9/1969 | Signouret .............................. 260/79 |
| 3,466,179 | 9/1969 | Greco .................................... 260/79 |
| 3,472,811 | 10/1969 | Kane .............................. 260/42.24 X |
| 3,560,451 | 2/1971 | Signouret ............................. 260/79 |
| 3,674,525 | 7/1972 | Louthan ................................ 260/79 |

*Primary Examiner*—Sandra M. Person
*Attorney, Agent, or Firm*—Lerner, David, Littenberg & Samuel

[57] ABSTRACT

Novel sulphur cements and concretes are provided. They contain, in addition to the sulphur, a particularly recited olefinic hydrocarbon polymer material, either added as such or prereacted with sulphur, as a chemical stabilizer, and a particularly recited particulate viscosity increasing, surface active, stabilizer, e.g. fly ash. Novel sulphur concretes are provided made from such sulphur cement and conventional natural or manufactured aggregates.

24 Claims, No Drawings

SULPHUR CEMENTS, PROCESS FOR MAKING SAME AND SULPHUR CONCRETES MADE THEREFROM

This is a continuation of application Ser. No. 581,735, filed May 29, 1975 and now abandoned.

BACKGROUND OF THE INVENTION

1. Field of the Invention

This invention relates to sulphur cements and concretes produced therefrom, and to processes for the preparation thereof.

2. Description of the Prior Art

Sulphur cements have a long history of use in specialized applications. Thus Canadian Pat. No. 71,686 issued to George McKay provided a sulphur-containing composition useful for sealing purposes at a joint, for roofing purposes, for the forming of ornamental figures, and for the coating of the exposed surfaces of iron or steel steps, the composition including sulphur, brick-dust, tin, lead, bismuth, plaster of paris and borax.

However, attempts to make durable, high strength concrete-like materials from sulphur cements have encountered cost, durability, or other difficulties that precluded commercialization. Proposals have been made to increase the strength of sulphur as a bonding agent by the addition of coal, sand or pumice thereto. Moreover peculiar characteristics were proposed to be imparted by the addition thereto of bitumens, metallic sulphides, and fibrous materials. Also U.S. Pat. No. 3,459,717 patented Aug. 5, 1969 by J. B. Signouret, provided a sulphur-based plastic composition of improved fireproofing characteristics by the incorporation, into the molten slphur, of a diester of dithiophosphoric acid and an ethylenic hydrocarbon. A major problem in th commericalization of sulphur cements has been the progressive embrittlement and subsequent crumbling, under thermal stress, of the sulphur cement. The cause of this embrittlement is believed to be the progressive crystallization of the initially amorphous sulphur. Partial inhibition of the crystallization has been achieved through various organic and inorganic additives.

Thiokol products (olefin polysulphides) have been used to stabilize the amorphous form of sulphur in sulphur cements. Thus, Canadian Pat. No. 356,181 issued Feb. 25, 1936 to W. W. Duecker, purports to provide a solution to the problem by dissolving, in the sulphur, certain olefin polysulphides or polymerization products thereof. These cements, however, were not practical on a large scale due to their high cost and disagreeable odor. Dicyclopentadiene has good stabilization properties and more favourable economics, but imparts a nauseating odor to the sulphur cement and has other shortcomings, e.g., its vapour, even at low concentrations, is highly toxic (see. for example, Kinkead et al, "The Mammalian Toxicity of Dicylcopentadiene". Toxicology and Applied Pharmacology, 20 552-561 (1971). Moreover, dicyclopentadiene requires refluxing with molten sulphur to avoid excessive loss of material in vapour form.

SUMMARY OF THE INVENTION

Aims of the Invention

An object of the invention is to provide a sulphur cement composition which does not suffer the disadvantages of the compositions of the prior art.

Another object of this invention is to provide a more durable sulphur cement.

Another object of this invention is to provide a sulphur cement which can be made with off-grade sulphur.

Yet another object of this invention is to provide a sulphur cement which is resistant to the corrosive influence of salts, most acids and solvents.

A further object of this invention is to provide a sulphur cement which provides good thermal insulation and which develops high strength within hours of cooling.

Yet a further object of this invention is to provide sulphur concretes made with the sulphur cements, which are self-extinguishing.

Statements of the Invention

By one broad aspect of this invention, a sulphur cement composition is provided comprising: (a) sulphur; (b) a viscosity increasing surface active finely divided particulate stabilizer; and (c) an olefinic hydrocarbon polymer material derived from petroleum and having a non-volatile content greater than about 50% by weight and a minimum Wijs iodine number of about 100 cg/g; and which is capable of reacting with sulphur to form a sulphur-containing polymer.

By another aspect of this invention, a sulphur concrete is provided, comprising: (A) a sulphur cement composition comprising (a) sulphur, (b) a viscosity increasing surface active finely divided particulate stabilizer, and (c) an olefinic hydrocarbon polymer material derived from petroleum and having a non-volatile content greater than about 50% by weight and a minimum Wijs iodine number of about 100 cg/g; and which is capable of reacting with sulphur to form a sulphur-containing polymer; and (B) natural or manufactured aggregates.

Preferably, in the sulphur cement compositions of this invention, for each 100 parts by weight of (a), there will be about 10 to 150 parts by weight of (b). Similar sulphur cement compositions may be used in the sulphur concrete compositions of this invention. In such sulphur concrete compositions, however, it is preferred that the ratio of B/A will be from about 20 to 64 of (B) so that, correspondingly, there will be from about 80 to 36 of (A).

By still another aspect of this invention, a process is provided for preparing a sulphur cement composition, which comprises: prereacting an olefinic hydrocarbon polymer material derived from petroleum and having a non-volatile content greter than about 50% by weight and a minimum Wijs iodine number of about 100 cg/g with sulphur at a temperature not exceeding about 155° C.; then adding the sulphur-containing polymer to further molten sulphur; and finally adding sufficient finely divided particular stabilizer thereto to provide a composition of the required consistency.

Other Features of the Invention

The present invention provides a sulphur cement which can be used for the manufacture of sulphur concrete having numerous applications in the construction field. It does not suffer the disadvantages of the products described previously and has positive advantages, as will be described hereinafter.

The sulphur cement according to this invention as described above employs two complementary stabilizers: one is the particularly recited chemical stabilizer; and the other is the particularly recited viscosity increasing, surface active stabilizer. The proportions of the chemical stabilizer may be varied depending upon the end use of th cement.

The chemical stabilizer used in the compositon of aspects of this invention is any of the olefinic hydrocarbon polymers derived from petroleum having a nonvolatile content greater than about 50% by weight and a minimum Wijs iodine number of 100 cg/g capable of reacting with sulphur to form a sulphur-containing polymer. Typically, the chemical stabilizer is used in amounts up to about 14% by weight of the total sulphur, and more especially in the proportion of about 1 - 5% of the total sulphur by weight. The amount of such chemical stabilizer required depends upon the end of use of the cement and the properties desired.

The chemical stabilizer can be incorporated into the final cement mix by several reaction routes within the ambit of this invention. Preferably, the chemical is pre-reacted at approximately 140° C. for about 30 minutes with a smaller proportion of sulphur than is required in the final mix. The resulting concentrate can then be either stored for future use or dissolved in the residual sulphur (liquified) required for the final mix at the mixing temperature.

While any chemical stabilizer having the above properties may be used, typical such chemical stabilizers are those known by the trade names of RP220, a product of Exxon Chemical Co.; RP020, a product of Exxon Chemical Co.; CTLA, a product of Enjay Chemical Co.; and Escopol, a product of Esso Chemical AB (Sweden): all identifying a heat reactive olefinic liquid hydrocarbon obtained by partial polymerization of olefins.

In order to provide a sulphur-containing cement of this invention having a workable consistency, it is necessary to add a finely divided viscosity increasing material, for example, fly ash, gypsum, dolomite, pulverized limestone, a mixture of pyrites and pyrrhotites, or rock dust of a size up to minus 100 mesh, but preferably of a size of minus 200 mesh. Fly ash from the burning of hydrocarbon fossil fuels and generally in the form of tiny hollow spheres called cenospheres and consisting of major amounts of silicon oxide and aluminum oxide e.g. 55.61% silicon oxide, 26.30% aluminum oxide, with smaller quantities of ferric oxide, calcium oxide, magnesium oxide, sodium oxide, potassium oxide and carbon, is particularly effective in this regard due to its small particle size, shape and surface texture. It has been found to impart an extra measure of durability to the final cement, independent of its source, and serves the dual function of viscosity increaser and sulphur cement stabilizer. Depending upon the degree of fineness of the fly ash and the consistency desired, an amount up to one and one-half times the total weight of the sulphur may be beneficially added.

A notable feature of the sulphur cement of aspects of this invention is that such sulphur cement does not require high purity sulphur and can be made with off-grade sulphur containing hydrocarbon impurities, blow dirt, and other "contaminants". The presence of hydrogen sulphide ($H_2S$) in the sulphur has been determined to be detrimental, but the simple process of remelting the sulphur usually reduces the concentration of this contaminant to harmless levels.

The resulting cement of an aspect of this invention is resistant to the corrosive influences of salts, most acids, and solvents. Hot oxidizing acids at high concentrations and strong concentrated bases do attack the cement, however. The cement is essentially impervious to moisture penetration. It provides good thermal insulation, is used hot with no water, and develops high strength within hours of cooling. Thus, sulphur concrete pouring can take place in winter without the usual freezing problems of conventional portland cement concretes, which require the presence of water for setting.

A wide range of aggregates can be used with the sulphur cement described above of one aspect of this invention to make strong, durable concretes of another aspect of this invention. Among the conventional aggregates useful herein are sand, crushed cinders, brick dust, foundry sand, crushed quartzite gravel, crushed limestone, siliceous tailing sand, expanded shale, expanded clay, crushed barite, crushed brick, crushed portland cement concrete, and crushed granite. Preferably, the aggregate particles are of angular shape and of rough surface texture as can be obtained by crushing. With a sufficiently fluid mix, or through use of heated molds, the mold surfaces are reproduced precisely. Where sulphur is readily available, the cement and the concrete of aspects of this invention can be produced at competitive costs. The compatibility of the sulphur cement with aggregates of wide ranging densities permits the design of concretes having very wide ranges of densities ranging, for example, as low as about 10 lbs. per cubic foot, to ranges between about 100 lbs. per cubic foot and about 230 lbs. per cubic foot, or even as high as about 500 lbs. per cubic foot. The sulphur concrete of an aspect of this invention can be reinforced in conventional fashion by the use of steel, asbestos or glass fiber, or other reinforcing materials.

The sulphur concretes of aspects of this invention tend to be self-extinguishing with ash contents approaching two-thirds the weight of sulphur and can be made fire resistant, and/or to inhibit the formation of $SO_2$ when heated, by the addition of suitable additives, e.g., 1,5,9-cyclododecatriene or the reaction product of diphenoxydithiophosphinic acid with sulphur and α-methyl styrene, in the manner taught by U.S. Pat. No. 3,459,717.

The sulphur concretes of aspects of this invention derived from the sulphur cements of a first aspect of this invention are not refractory materials and will soften and melt if heated above 120° C., although the rate of melting is slow due to the low thermal conductivity imparted to the concrete by the sulphur.

The principles developed for the grading of aggregates used in conventional concretes are essentially unchanged for sulphur concretes of aspects of this invention except for the much greater tolerance of fines and silt of the sulphur concretes. About 80% of the ultimate concrete strenght is developed in 1 day; virtually 100% of the ultimate strength is realized after 4 days.

These sulphur concretes may be used as a construction material for a wide variety of precast and poured-in-place applications such as, for example, sidewalks, steps, parking curbs, highway median barriers, sewer pipe, ceptic tanks, pilings, footings, foundations, pavements, industrial tanks, ponds, swimming pools, etc. The hot sulphur concrete mix may also be pumped and sprayed for waterproof and erosion proof coatings on earth-fill dikes, highway and railway embankments and as linings for irrigation canals, farm ponds, etc.

The examples given below are intended only to illustrate aspects of the present invention.

SAMPLES 1 – 7. PREREACTION OF THE HYDROCABON STABILIZERS

The hydrocarbon stabilizer (at about 25° C.) was added to molten for a wide variety of precast and poured-in-place applications such as, for example, sidewalks, steps, parking curbs, highway median barriers, sewer pipe, ceptic tanks, pilings, footings, foundations, pavements, industrial tanks, ponds, swimming pools, etc. The hot sulphur concrete mix may also be pumped and sprayed for waterproof and erosion proof coatings on earth-fill dikes, highway and railway embankments and as linings for irrigation canals, farm ponds, etc. sulphur (at about 140° C.) with vigorous stirring. Heat was applied only to maintain a reaction temperature of about 140° to about 150° C. At this temperature reaction times were in the order of about 15 to about 40 minutes. The progress of the reaction could be monitored by the degree of homogeneity of the mix, by careful observation of the temperature of the reaction mixture, or by observation of the increasing viscosity of the mixture. At sulphur-stabilizer ratios of less than 4:1 by weight, control of the addition rate was required to prevent the exothermicity of the reactions raising temperatures above 155° C., at which point hydrogen sulphide ($H_2S$) was evolved with consequent foaming and degradation of the product.

When reactions were conducted under the above-prescribed conditions, the product was a sulphur-containing polymer which, on cooling, possessed glass-like properties which were retained indefinitely.

The properties of the olefinic hydrocarbon polymers used for illustrative purposes herein are given in Table 1. Reaction conditions for the preparation of seven sulphur-containing polymers are contained in Table 2.

TABLE 1

| Characteristics of Stabilizers | | | | |
|---|---|---|---|---|
| | RP220 | RP020 | CTLA | Escopol |
| Flash Point (COC) minimum | 150 | 138 | 150 | 125 |
| Gravity (API) maximum | 4 | 4.0 | 9.6 | 3 |
| Iodine Number (100cg/g) minimum | 200 | 160 | 255 | 135 |
| Non-volatile Matter (% by weight) (3 hrs. at 105° C) minimum | 80 | 70 | 83 | 75 |
| Density (15.6° C.) gm/cc | 1.05 | 1.04 | 1.00 | 1.03 |
| Viscosity (cst/100° C) maximum | 25 | 26 | 28 | 25* |

*cst/50° C.

TABLE 2

Reaction Conditions for the Preparation of Sulphur-containing Polymers

| Sample | Stabilizer (STB) | Weight STB | (Kg) S | Reaction Temp. (° C) | Reaction Time (Min.) | Product Color |
|---|---|---|---|---|---|---|
| 1 | CTLA | 12.5 | 37.5 | 140 | 30 | dark brown |
| 2 | CTLA | 8.3 | 41.7 | 140 | 40 | dark brown |
| 3 | Escopol | 10.0 | 40.0 | 150 | 15 | light brown |
| 4 | Escopol | 14.5 | 35.5 | 140 | 20 | light brown |
| 5 | RP220 | 8.3 | 41.7 | 150 | 15 | dark brown |
| 6 | Rp220 | 12.5 | 37.5 | 140 | 20 | dark brown |
| 7 | RP020 | 12.5 | 37.5 | 140 | 15 | dark brown |

EXAMPLES 1 TO 9

Sulphur Cements and Concretes Derived Therefrom

A first series of sulphur cements, Examples 1 through 9, were prepared by addition of: the required sulphur (less than contained in the prereacted material), the prereacted material, and lastly, fly ash to achieve the desired consistency of the sulphur cement. Then the aggregate was added to provide the sulphur concrete.

The components were mixed at about 130° C. in a heated ⅛ cubic foot concrete mixer for about 15 minutes before pouring into molds. Compaction was obtained through vibration or tapping of the molds. For simplicity of representation, all the examples are chosen using RP220 as the hydrocarbon stabilizer.

EXAMPLES 10 TO 13

A second series of sulphur cements and sulphur concretes was prepared in a manner analogous to that of Examples 1 to 9 with the exception that raw stabilizer (i.e. not prereacted with sulphur) was added directly to the mix at the previous point of prereacted material addition. In order to allow complete reaction, the mixing time was increased to 20 minutes.

EXAMPLES 14 TO 22

A third series of sulphur cements and sulphur concretes were prepared in a manner analogous to that of Examples 1 to 9 but with the omission of the hydrocabon stabilizer. Sulphur concretes prepared according to these mix designs would be limited to reasonably isothermal applications, such as underground or underwater structures subjected to very mild thermal cycling.

The results are summarized and tabulated below in Table 3.

TABLE 3

Sulphur Concretes - Composition and Properties

| Example | | Percent by weight | | | Chemical Stabilizer RP220 | Density (g/cc) | Compressive* Strength) |
|---|---|---|---|---|---|---|---|
| | | Aggregate | Sulphur | Fly Ash | | | |
| 1 | Crushed quartzite gravel | 71.7 | 20.4 | 7.4 | 0.50 | 2.38 | 7.160 |
| 2 | Crushed limestone | 73.5 | 26 | — | 0.50 | 2.41 | 5.290 |
| 3 | Siliceous tailings sand | 63.5 | 34.8 | — | 1.7 | 2.21 | 5.290 |
| 4 | Expanded shale | 38.6 | 37.6 | 23.2 | 0.59 | 1.73 | 4.610 |
| 5 | Expanded clay | 38.4 | 32.0 | 29.2 | 0.38 | 1.77 | 8.350 |
| 6 | Crushed barite | 78.7 | 15.0 | 5.9 | 0.38 | 3.18 | 7.520 |
| 7 | Crushed brick | 34.5 | 27.3 | 17.5 | 0.68 | 2.17 | 8.530 |
| 8 | Crushed p.c. concrete | 64.1 | 24.1 | 11.2 | 0.60 | 2.23 | 5.690 |
| 9 | Crushed granite | 65.9 | 20.0 | 12.6 | 0.50 | 2.39 | 7.760 |
| 10 | Crushed quartzite | 64.4 | 19.6 | 15.5 | 0.49 | 2.38 | 8.710 |

TABLE 3-continued

Sulphur Concretes - Composition and Properties

| Example | | Percent by weight | | | Chemical Stabilizer RP220 | Density (g/cc) | Compressive* Strength) |
|---|---|---|---|---|---|---|---|
| | | Aggregate | Sulphur | Fly Ash | | | |
| 11 | gravel Siliceous tailings sand | 60.9 | 30.8 | 7.5 | 0.77 | 2.23 | 6.530 |
| 12 | Expanded shale | 50.0 | 26.6 | 22.7 | 0.66 | 1.70 | 4.740 |
| 13 | Crushed barite | 79.1 | 23.2 | 7.4 | 0.33 | 3.28 | 7.650 |
| 14 | Crushed quartzite gravel | 65.6 | 18.8 | 15.6 | — | 2.40 | 9.270 |
| 15 | Crushed limestone | 60.8 | 21.8 | 17.4 | — | 2.32 | 7.730 |
| 16 | Crushed granite | 66.2 | 21.2 | 12.6 | — | 2.37 | 8.250 |
| 17 | Crushed barite | 79.6 | 12.8 | 7.6 | — | 3.25 | 7.570 |
| 18 | Siliceous tailings sand | 61.2 | 34.8 | 4.0 | — | 2.20 | 6.420 |
| 19 | Expanded shale | 35.8 | 35.8 | 28.4 | — | 1.68 | 4.860 |
| 20 | Expanded clay | 41.0 | 34.0 | 25.0 | — | 1.79 | 9.320 |
| 21 | Crushed brick | 55.0 | 27.4 | 17.6 | — | 2.18 | 10.130 |
| 22 | Crushed p.c. concrete | 64.8 | 23.0 | 12.2 | — | 2.24 | 7.840 |

*Mean of three (3) tests.

I claim:

1. A sulphur cement composition comprising:
   a. sulphur;
   b. a viscosity increasing surface active finely divided particulate stabilizer;
   and c. up to about 10 parts by weight of the total amount of sulphur of an olefinic hydrocarbon polymer material derived from petroleum and having a non-volatile content greater than about 50% by weight and a minimum Wijs iodine number of about 100 cg/g; and which is capable of reacting with sulphur to form a sulphur-containing polymer.

2. The sulphur cement composition of claim 1 including an olefinic hydrocarbon polymer material (c) which is in the form of a sulphur-containing polymer provided by reacting sulphur with said olefinic hydrocarbon.

3. The sulphur cement composition of claim 1 wherein the particulate stabilizer (b) is of a size of minus 100 mesh.

4. The sulphur cement composition of claim 3, wherein the particulate stabilizer (b) is fly ash, of a size of minus 200 mesh.

5. The sulphur cement of claim 2, wherein, for each 100 parts by weight of (a), there are about 10 to about 150 parts by weight of (b) and up to about 10 parts by weight of (c).

6. The sulphur cement of claim 4, for each 100 parts by weight of (a), there are about 10 to about 150 parts by weight of (b) and up to about 10 parts by weight of (c).

7. The sulphur cement of claim 5, wherein, the amount of (c) is about 1 to about 5% of the total sulphur by weight.

8. The sulphur cement of claim 6, wherein the amount of (c) is about 1 to about 5% of the total sulphur by weight.

9. The sulphur cement of claim 6, wherein the amount of (c) is about 1 to about 5% of the total sulphur by weight.

10. The sulphur cement of claim 1, including an additive to provide fire resistance.

11. The sulphur cement of claim 10, wherein the additive is 1,5,9-cyclododecatriene 12. The sulphur cement of claim 10, wherein the additive is the reaction product of diphenoxydithiophosphinic acid with sulphur and with α-methyl styrene.

13. A sulphur concrete comprising:
   A. a sulphur cement composition comprising
      a. sulphur,
      b. a viscosity increasing surface active finely divided particulate stabilizer,
      and c. up to about 10 parts by weight of the total amount of sulphur of an olefinic hydrocarbon polymer material derived from petroleum and having a non-volatile content greater than about 50% by weight and a minimum Wijs iodine number of about 100 cg/g; and which is capable of reacting with sulphur to form a sulphur-containing polymer;
   and B. natural or manufactured aggregates.

14. The sulphur concrete of claim 13, wherein the ratio of B/A is from 20 – 64 of (B) to, correspondingly, from 80 – 36 of (A).

15. The sulphur concrete of claim 13, wherein in (A), the olefinic hydrocarbon polymer material (c) is present in the form of a sulphur-containing polymer provided by reacting sulphur with said olefinic hydrocarbon.

16. The sulphur concrete of claim 15, wherein in (A), the particulate stabilizer (b) is fly ash of minus 200 mesh.

17. The sulphur concrete of claim 14, wherein in (A), for each 100 parts by weight of (a), there are about 10 to about 150 parts by weight of (b) and up to about 10 parts by weight of (c).

18. The sulphur concrete of claim 15, wherein in (A), for each 100 parts by weight of (a), there are about 10 to about 150 parts by weight of (b) and up to about 10 parts by weight of (c).

19. The sulphur concrete of claim 16, wherein in (A), for each 100 parts by weight of (a), there are about 10 to about 150 parts by weight of (b) and up to about 10 parts by weight of (c).

20. The sulphur concrete of claim 16, wherein in (A), for each 100 parts by weight of (a), there are about 10 to about 150 parts by weight of (b) and wherein the amount of (c) is about 1 to about 5% of the total sulphur by weight.

21. The sulphur concrete of claim 13, including in (A) an additive to provide fire resistance.

22. The sulphur concrete of claim 21, wherein the additive is the reaction product of diphenoxydithiophosphinic acid with sulphur and with α-methyl styrene.

23. A process for preparing a sulphur cement composition which comprises: prereacting an olefinic hydrocarbon polymer material derived from petroleum and having a non-volatile content greater than about 50% by weight and a minimum Wijs iodine number of about 100 cg/g with sulphur at a temperature not exceeding about 155° C.; then adding the sulphur-containing polymer to further molten sulphur; and finally adding sufficient finely divided particulate stabilizer thereto to provide a composition of the required consistency.

24. The sulphur cement of claim 10, wherein the additive is the reaction product of diphenoxydithiophosphinic acid with sulphur and with α-methyl styrene.

* * * * *

UNITED STATES PATENT AND TRADEMARK OFFICE
CERTIFICATE OF CORRECTION

PATENT NO. : 4,058,500

DATED : November 15, 1977

INVENTOR(S) : Alan H. Vroom

It is certified that error appears in the above-identified patent and that said Letters Patent are hereby corrected as shown below:

```
Column 1, line 35, "slphur" should read --sulphur--.
Column 2, line 43, "B/A" should read --A/B--.
Column 2, line 55, "particular" should read --particulate--.
Column 3, line 3, "th" should read --the--.
Column 3, line 11, "14%" should read --10%--.
Column 3, line 14, cancel the word "of".
Column 4, line 61, "ceptic" should read --septic--.
Column 5, line 5, cancel "for a wide variety of precast and".
Column 5, cancel lines 6 through 13.
Columns 6 and 7, Table 3, under column entitled Compressive*
     Strength, change "." to --,-- in Examples 1 through 22.
Column 7, Example 13, "23.2" should read --13.2--.
Column 8, line 39, "B/A" should read --A/B--.
```

Signed and Sealed this

Sixth Day of June 1978

[SEAL]

*Attest:*

RUTH C. MASON
*Attesting Officer*

DONALD W. BANNER
*Commissioner of Patents and Trademarks*